(12) United States Patent
Tanabe et al.

(10) Patent No.: US 9,575,305 B2
(45) Date of Patent: Feb. 21, 2017

(54) DIGITAL MICROSCOPE APPARATUS, INFORMATION PROCESSING METHOD, AND INFORMATION PROCESSING PROGRAM

(71) Applicant: Sony Corporation, Tokyo (JP)

(72) Inventors: Norihiro Tanabe, Tokyo (JP); Ryu Narusawa, Kanagawa (JP); Nobuhiro Hayashi, Kanagawa (JP); Takamichi Yamakoshi, Tokyo (JP); Takashi Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 273 days.

(21) Appl. No.: 14/200,810

(22) Filed: Mar. 7, 2014

(65) Prior Publication Data

US 2014/0267676 A1    Sep. 18, 2014

(30) Foreign Application Priority Data

Mar. 14, 2013 (KR) .............................. 2013-051274

(51) Int. Cl.
*G02B 21/00* (2006.01)
*G02B 21/36* (2006.01)
*A61B 3/00* (2006.01)

(52) U.S. Cl.
CPC ................... *G02B 21/365* (2013.01)

(58) Field of Classification Search
CPC ..... H01J 37/28; H01J 37/224; G01N 21/6458; G02B 21/24; H04N 7/18; H01L 2924/00014; H01L 2224/29101; H01L 2224/32145; H01L 2224/48091; H01L 2224/48227; H01L 2224/73265; H01L 2224/05599; H01L 2224/45099; H01L 2924/00; H01L 2924/00012; H01L 2924/014

See application file for complete search history.

(56) References Cited

U.S. PATENT DOCUMENTS

| 5,833,617 | A | * | 11/1998 | Hayashi | ............. | A61B 1/00009 250/461.1 |
| 2001/0049473 | A1 | * | 12/2001 | Hayashi | ............. | A61B 1/00009 600/317 |
| 2006/0285075 | A1 | * | 12/2006 | Matsumura | ............. | A61B 3/12 351/206 |

FOREIGN PATENT DOCUMENTS

| JP | 2011-124948 | A |   | 6/2011 |             |
| JP | 2011124948  |   | * | 6/2011 | H04N 5/335  |
| JP | 2012-008450 | A |   | 1/2012 |             |
| JP | 2012008450  |   | * | 12/2012 | G02B 21/00 |

* cited by examiner

*Primary Examiner* — Sath V Perungavoor
*Assistant Examiner* — Howard D Brown, Jr.
(74) *Attorney, Agent, or Firm* — Sheridan Ross P.C.

(57) ABSTRACT

A digital microscope apparatus includes an illumination optical system configured to emit illumination light; a stage having an opening capable of transmitting the light therethrough, on which a preparation can be placed in accordance with a position of the opening; an enlarging imaging unit including an objective lens configured to enlarge an image and disposed to face the system with the stage disposed therebetween, and an imaging device configured to capture an image enlarged by the lens; a white image acquiring unit configured to open the opening, to cause the system to emit the light in a state where an image point of the system is aligned with a focal point of the lens, and to acquire, as a white image, an image formed on an imaging surface of the device; and a calculation unit configured to use the captured white image to calculate a shading correction coefficient.

10 Claims, 6 Drawing Sheets

DIGITAL MICROSCOPE APPARATUS, INFORMATION PROCESSING METHOD, AND INFORMATION PROCESSING PROGRAM

CROSS REFERENCE TO RELATED APPLICATIONS

This application claims the benefit of Japanese Priority Patent Application JP 2013-051274 filed Mar. 14, 2013, the entire contents of which are incorporated herein by reference.

BACKGROUND

The present disclosure relates to shading correction in a digital microscope apparatus.

In a digital microscope apparatus, it is important to appropriately perform shading correction when a pathological image is acquired from a pathological slide (preparation PRT). In order to appropriately perform shading correction, it is important to appropriately capture, for shading correction, an image in which a biological sample SPL is not photographed (hereinafter, referred to as entirely-white image or white image).

As a method of capturing an entirely-white image when performing shading correction, a method of acquiring an entirely-white image in which all unevenness factors of a light source, an illumination optical system, and an imaging optical system are superimposed by capturing an entirely-white image without disposing a sample on a stage is disclosed (see, for example, Japanese Patent Application Laid-open No. 2011-124948).

Moreover, in order to prevent the contrast of a pathological image of a pathological slide captured by a digital microscope apparatus from inappropriately decreasing, an illumination optical system should be appropriately in focus.

In this regard, there exists a technique in which a phase difference autofocusing (AF) is used to automatically and appropriately allow an illumination optical system to be in focus (see, for example, Japanese Patent Application Laid-open No. 2012-008450).

SUMMARY

In the digital microscope apparatus, however, images of a lot of samples have been requested to be acquired with high quality and at high speed as much as possible, but the request is not met sufficiently.

In view of the circumstances as described above, it is desirable to provide a digital microscope apparatus, an information processing method, and an information processing program that are capable of acquiring images of a lot of samples with high quality and at high speed as much as possible.

According to an embodiment of the present disclosure, there is provided a digital microscope apparatus, including an illumination optical system configured to emit illumination light, a stage having an opening capable of transmitting the illumination light therethrough, on which a preparation is allowed to be placed in accordance with a position of the opening, an enlarging imaging unit including an objective lens that is configured to enlarge an image and is disposed so as to face the illumination optical system with the stage disposed therebetween and an imaging device configured to capture an image enlarged by the objective lens, a white image acquiring unit configured to open the opening of the stage, to cause the illumination optical system to emit the illumination light in a state where an image point of the illumination optical system is aligned with a focal point of the objective lens of the enlarging imaging unit, and to acquire, as a white image, an image formed on an imaging surface of the imaging device of the enlarging imaging unit, and a calculation unit configured to use the captured white image to calculate a shading correction coefficient.

The digital microscope apparatus may further include a defocus detecting unit configured to detect information on defocus of the enlarging imaging unit, and an adjustment unit configured to adjust a position of the illumination optical system in an optical axis direction, in which the white image acquiring unit may cause the adjustment unit to operate so that an image of a field stop of the illumination light is formed on the imaging surface of the imaging device of the enlarging imaging unit, based on the defocus information.

In the digital microscope apparatus, the adjustment unit may perform the adjustment by moving the position of the illumination optical system in a state where the preparation is placed on the stage to a side of the stage by a predetermined distance.

In the digital microscope apparatus, the white image acquiring unit may move, when the illumination optical system is moved, the position of the stage in a state where the preparation is placed on the stage by the predetermined distance in the same direction as the movement direction of the illumination optical system.

In the digital microscope apparatus, the predetermined distance may satisfy a relationship given by $d(n-1)/n$ (where d represents a thickness of the preparation and n represents a refractive index of the preparation).

In the digital microscope apparatus, the white image acquiring unit sets an intensity of the illumination light to a first intensity when the enlarged image is captured in a state where the preparation is placed on the stage, and sets the intensity of the illumination light to a second intensity when the white image is captured, the second intensity being lower than the first intensity.

According to an embodiment of the present disclosure, there is provided an information processing method, including causing, by a white image acquiring unit, an adjustment unit configured to adjust a focal position of illumination light to operate so that an image of a field stop of the illumination light is formed on an imaging surface of an imaging device of an enlarging imaging unit in a state where a preparation is not placed on a stage having an opening capable of transmitting the illumination light therethrough, and the enlarging imaging unit to capture the image of the field stop formed on the imaging surface of the imaging device as a white image, and calculating, by a calculation unit, a shading correction coefficient using the captured white image.

According to an embodiment of the present disclosure, there is provided an information processing program that causes a computer to function as a white image acquiring unit configured to cause an adjustment unit configured to adjust a focal position of illumination light to operate so that an image of a field stop of the illumination light is formed on an imaging surface of an imaging device of an enlarging imaging unit in a state where a preparation is not placed on a stage having an opening capable of transmitting the illumination light therethrough, and the enlarging imaging unit to capture the image of the field stop formed on the imaging surface of the imaging device as a white image, and a calculation unit configured to calculate a shading correction coefficient using the captured white image.

As described above, according to the present disclosure, it is possible to acquire images of a lot of samples with high quality and at high speed as much as possible.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments according to the present disclosure will be described with reference to the drawings.

First Embodiment

Figure 1:
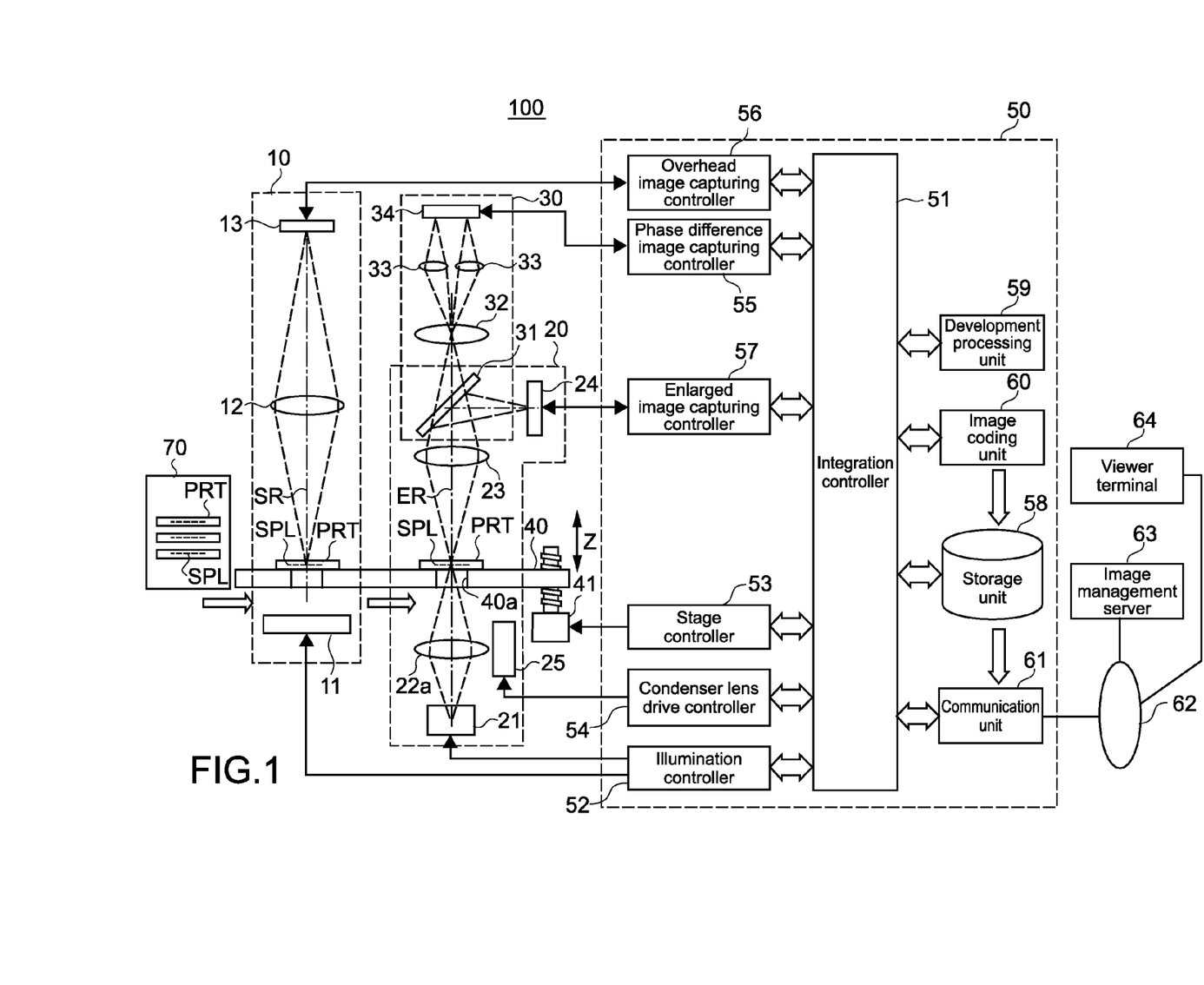
FIG. 1 is a block diagram showing a whole configuration of a digital microscope apparatus 100 according to an embodiment of the present disclosure.

FIG. 1 is a block diagram showing a whole configuration of the digital microscope apparatus 100 according to a first embodiment of the present disclosure.
(Overview)
In this embodiment, a white image for shading correction is captured in a state where a preparation is not placed on an opening of a stage of a microscope. In the absence of a preparation, the length of an optical path from a light source to an imaging device is changed because a glass slide constituting the preparation does not exist. Therefore, in a state where a preparation is not placed on a stage, a focal position of an illumination optical system is adjusted to be in focus. Thus, it is possible to appropriately capture a white image in a state where an illumination optical system is in focus, and to appropriately perform shading correction based on the appropriately captured white image.

(Whole Configuration)
The digital microscope apparatus 100 includes an overhead image capturing unit 10, an enlarged image capturing unit (imaging unit) 20, a phase difference image capturing unit 30, the stage 40, and a controller 50.

The overhead image capturing unit 10 captures an image of the entire preparation PRT on which a biological sample SPL is disposed (hereinafter, the image being referred to as "overhead image").

The enlarged image capturing unit 20 captures an image in which the biological sample SPL is enlarged at a predetermined magnification (hereinafter, the image being referred to as "enlarged image").

The phase difference image capturing unit 30 detects, as amount of defocus, the amount and orientation of displacement in an optical axis direction between a focal point of the objective lens 23 of the enlarged image capturing unit 20 and the biological sample SPL on the preparation PRT. Moreover, the phase difference image capturing unit 30 detects, as amount of defocus, the amount and orientation of displacement of the condenser lens 22a in the optical axis direction.

The stage 40 moves the preparation PRT placed thereon to a position for imaging by the overhead image capturing unit 10 and a position for imaging by the enlarged image capturing unit 20. The stage 40 is configured to be movable by a stage drive mechanism 41 in a direction of an optical axis (Z-axis direction) of the objective lens 23 of the enlarged image capturing unit 20 and also in a direction (X-axis direction and Y-axis direction) orthogonal to the direction of the optical axis.

It should be noted that the preparation PRT is acquired by fixing the sample SPL to a glass slide by a predetermined fixing method. The sample SPL is a biological sample that includes tissue slices of connective tissues such as blood, epithelial tissues, and tissues including both of the above tissues, or the like or includes smear cells. The tissue slices or smear cells are subjected to various types of staining as necessary. Examples of staining include not only general staining represented by HE (hematoxylin-eosin) staining, Giemsa staining, Papanicolaou staining, Ziehl-Neelsen staining, and Gram staining but also fluorescent staining such as FISH (Fluorescence In-Situ Hybridization) and an enzyme antibody technique.

The digital microscope apparatus 100 is additionally equipped with a preparation stock loader 70 that stores the preparations PRT each containing the sample SPL and loads the stored preparations PRT one by one onto the stage 40. It should be noted that the preparation stock loader 70 may be integrated into the digital microscope apparatus 100.

Next, the details of the overhead image capturing unit 10, the enlarged image capturing unit 20, and the phase difference image capturing unit 30 described above will be described.
(Overhead Image Capturing Unit 10)
As shown in FIG. 1, the overhead image capturing unit 10 includes a light source 11, an objective lens 12, and an imaging device 13.

The light source 11 is provided on a surface of the stage 40, which is on the opposite side to the surface on which the preparation is arranged.

In the overhead image capturing unit 10, a label light source (not shown) that applies light for imaging supplementary information described on a label attached to the preparation PRT may be separately provided.

The objective lens 12 is arranged on the side of the surface of the stage 40 on which the preparation PRT is arranged (hereinafter referred to as preparation PRT arrangement surface), with the normal line of a reference position of the overhead image capturing unit 10 on the preparation PRT arrangement surface being as an optical axis SR. Transmitted light that has been transmitted through the preparation PRT placed on the stage 40 is collected by the objective lens 12 and forms an image onto the imaging device 13 that is provided behind the objective lens 12 (that is, in a traveling direction of the illumination light).

Light covering an imaging range in which the entire preparation PRT placed on the preparation PRT arrangement surface of the stage 40 is included (in other words, transmitted light that has been transmitted through the entire preparation PRT) is focused onto the imaging device 13 to form an image. The image formed onto the imaging device 13 is an overhead image being a microscope image of the entire preparation PRT.

(Enlarged Image Capturing Unit)

As shown in FIG. 1, the enlarged image capturing unit 20 includes the light source 21, the condenser lens (illumination optical system) 22a, the objective lens 23, an imaging device 24, and a condenser lens drive mechanism 25.

The light source 21 applies illumination light. The light source 21 is provided on the surface of the stage 40, which is on the opposite side to the preparation arrangement surface.

The condenser lens 22a is a lens that collects the illumination light applied from the light source 21 to guide the light to the preparation PRT on the stage 40. The condenser lens 22a is arranged between the light source 21 and the stage 40, with the normal line of a reference position of the enlarged image capturing unit 20 on the preparation PRT arrangement surface being as an optical axis ER.

It should be noted that although not shown in FIG. 1, a light collection optical system 22c that collects illumination light emitted from the light source 21, a field stop 22b, and the like are provided between the light source 21 and the condenser lens 22a.

Hereinafter, the above-mentioned light collection optical system 22c, the field stop 22b, and the condenser lens 22a are referred to as "illumination optical system."

The condenser lens drive mechanism 25 changes the position of the condenser lens 22a on the optical axis ER by driving the condenser lens 22a along a direction of the optical axis ER.

The objective lens 23 is arranged on the preparation PRT arrangement surface side of the stage 40, with the normal line of the reference position of the enlarged image capturing unit 20 on the preparation PRT arrangement surface being as the optical axis ER. In the enlarged image capturing unit 20, the objective lens 23 is appropriately replaced, so that the image of the biological sample SPL can be enlarged and captured at various magnifications. Transmitted light that has been transmitted through the preparation PRT placed on the stage 40 is collected by the objective lens 23, and forms an image onto the imaging device 24 that is provided behind the objective lens 23 (that is, in a traveling direction of the illumination light).

A beam splitter 31 is provided on the optical axis ER between the objective lens 23 and the imaging device 24. The beam splitter 31 guides a part of transmitted light that has been transmitted through the objective lens 23 to the phase difference image capturing unit 30.

On the imaging device 24, an image of an imaging range with predetermined horizontal and vertical widths (hereinafter, referred to as small area) on the preparation PRT arrangement surface of the stage 40 is formed in accordance with a pixel size of the imaging device 24 and a magnification of the objective lens 23. It should be noted that because a part of the biological sample SPL is enlarged by the objective lens 23, the above-mentioned imaging range is sufficiently narrower than the imaging range of the imaging device 13.

It should be noted that although not shown in FIG. 1, the field stop 22b (see FIG. 8) that limits the range of illumination light applied from the light source 21 to the preparation PRT on the stage 40 is provided between the light source 21 and the condenser lens 22a. The condenser lens 22a is brought into focus by using an edge portion of the field stop 22b as a guide.

(Phase Difference Image Capturing Unit)

As shown in FIG. 1, the phase difference image capturing unit 30 includes the beam splitter 31, a field lens 32, a separator lens 33, and an imaging device 34.

As described above, the beam splitter 31 is provided on the optical axis ER between the objective lens 23 and the imaging device 24 of the enlarged image capturing unit 20, and reflects a part of transmitted light that has been transmitted through the objective lens 23. In other words, light that has been transmitted through the objective lens 23 is split into reflected light that proceeds to the imaging device 24 and transmitted light that proceeds to the field lens 32 in the phase difference image capturing unit 30.

The field lens 32 is provided on a traveling direction side of the transmitted light split by the beam splitter 31. The field lens 32 collects the transmitted light that has been split by the beam splitter 31 and guides the transmitted light to the separator lens 33 that is provided behind the field lens 32 (on a traveling direction side of the transmitted light).

The separator lens 33 divides the light beam guided from the field lens 32 into two light beams. The divided light beams form a set of subject images on an imaging surface of the imaging device 34 provided behind the separator lens 33 (on the traveling direction side of the transmitted light).

On the imaging device 34, an image is formed by light that has been transmitted through the separator lens 33. As a result, a set of subject images is formed on the imaging surface of the imaging device 34. It should be noted that here, although light beams that have been transmitted through two separator lenses 33 are captured by the single imaging sensor 34, the light beams that has been transmitted through the two separator lenses 33 may be captured by two imaging devices 34. A phase difference exists between the set of formed subject images because light beams in various directions, which are emitted from the field lens 32, enter the separator lens 33. In the following description, the set of subject images is referred to as a "phase difference image."

It should be noted that the beam splitter 31 is provided between the objective lens 23 and the imaging device 24 in the above description, but a light beam branching unit that branches a light beam is not limited to the beam splitter. A movable mirror and the like may be used as the beam splitter. Alternatively, a mechanism that switches between the lens barrel of the enlarged image capturing unit 20 and the lens barrel of the phase difference image capturing unit 30 may be used.

Additionally, in the above description, the configuration that includes the field lens 32, the separator lens 33, and the imaging device 34 as the phase difference autofocusing (AF) optical system in the phase difference image capturing unit 30 is shown, but it is not limited to such an example. Such a phase difference AF optical system may be another optical system as long as the similar function can be achieved. For example, a condenser lens and twin lenses may be used instead of the field lens and the separator lens.

Moreover, the imaging devices provided on the overhead image capturing unit 10, the enlarged image capturing unit 20, and the phase difference image capturing unit 30 may be each a one-dimensional imaging device or a two-dimensional imaging device.

Additionally, in the above description, the phase difference image capturing unit 30 is arranged on the optical axis ER of the objective lens 23, and the imaging device 24 of the enlarged image capturing unit 20 is arranged at a position on which the reflected light split by the beam splitter 31 is incident. Conversely, the imaging device 24 of the enlarged image capturing unit 20 may be arranged on the optical axis ER of the objective lens 23 and the phase difference image capturing unit 30 may be arranged at a position on which the reflected light split by the beam splitter 31 is incident.

[Controller 50]

The controller 50 includes the integration controller 51, an illumination controller 52, a stage controller 53, a condenser lens drive controller 54, a phase difference image capturing controller 55, an overhead image capturing controller 56, an enlarged image capturing controller 57, a storage unit 58, a development processing unit 59, and an image coding unit 60.

The integration controller 51 is constituted of hardware elements of a computer including, for example, a CPU (Central Processing Unit), a ROM (Read Only Memory), and a RAM (Random Access Memory). Alternatively, the integration controller 51 may be constituted of a dedicated IC such as an FPGA (field programmable gate array). The integration controller 51 exchanges various signals with the illumination controller 52, the stage controller 53, the condenser lens drive controller 54, the phase difference image capturing controller 55, the overhead image capturing controller 56, the enlarged image capturing controller 57, the storage unit 58, the development processing unit 59, the image coding unit 60, and a communication unit 61, and executes various types of arithmetic processing and control to acquire an enlarged image of a sample. Various programs and various types of data for the various types of arithmetic processing and control are loaded to the RAM. The CPU executes the programs loaded to the RAM. The ROM stores the programs and data loaded to the RAM.

The illumination controller 52, the stage controller 53, the condenser lens drive controller 54, the phase difference image capturing controller 55, the overhead image capturing controller 56, and the enlarged image capturing controller 57 may be each constituted of hardware elements of a computer including, for example, a CPU, a ROM, and a RAM or may be constituted of a dedicated IC such as an FPGA.

The development processing unit 59 and the image coding unit 60 are each constituted of hardware elements of a computer including, for example, a CPU, a ROM, and a RAM. Alternatively, the development processing unit 59 and the image coding unit 60 may be constituted of a GPU (Graphics Processing Unit).

The illumination controller 52 controls the light sources 11 and 21 according to an instruction on an illumination method for the sample SPL. The instruction is given from the integration controller 51. For example, the illumination controller 52 selects the type of light source, such as the intensity of illumination light of the light sources 11 and 21, a light source for a bright field, a light source for a dark field, and the like according to the instruction from the integration controller 51. For example, a light source that applies visible light or the like is assumed as the light source for a bright field. Examples of the light source for a dark field include a light source to apply light having a wavelength that can excite a fluorescent marker used in special staining.

For example, when receiving an instruction from the integration controller 51 to capture an overhead image, the stage controller 53 drives the stage drive mechanism 41 to move the stage 40 in a stage surface direction (in X- and Y-axis directions) in such a way that the entire preparation PRT falls within the imaging range of the imaging device 13. The stage controller 53 drives the stage drive mechanism 41 to move the stage 40 in the Z-axis direction in such a way that the objective lens 12 is focused on the entire preparation PRT.

Further, when receiving an instruction from the integration controller 51 to capture an enlarged image, the stage controller 53 drives the stage drive mechanism 41 to move the stage 40 in the stage surface direction (in X- and Y-axis directions) in such a way that the instructed imaging range (small area) of the sample SPL falls within the imaging range of the imaging device 24. The stage controller 53 drives the stage drive mechanism 41 to move the stage 40 in the Z-axis direction in such a way that the objective lens 23 is focused on the sample SPL.

The condenser lens drive controller 54 controls the condenser lens drive mechanism 25 based on information on the amount of defocus of the field stop of the illumination light from the light source 21 from the integration controller 51, to bring the condenser lens 22a into focus and adjust the illumination light from the light source 21 so as to be applied only to an observation area of the sample SPL. The information on the field stop includes the amount of defocus and the orientation of defocus. Those pieces of information are acquired based on a distance between a set of phase difference images generated by the phase difference image capturing unit 30.

The phase difference image capturing controller 55 acquires signals of the set of phase difference images that are formed on the imaging surface of the imaging device 34 provided to the phase difference image capturing unit 30, and supplies the signals to the integration controller 51. The integration controller 51 calculates, according to the program loaded to the main memory of the integration controller 51, the amount of defocus and the orientation of defocus of the focal point of the objective lens 23 of the enlarged image capturing unit 20 with respect to the sample SPL, based on the distance between the set of phase difference images that are acquired from the phase difference image capturing controller 55.

Based on those pieces of information, the integration controller 51 generates control information for the stage 40 and supplies the control information to the stage controller 53. The stage controller 53 drives the stage drive mechanism 41 to move the stage 40 in the Z-axis direction based on the control information from the integration controller 51. Thus, the phase difference autofocusing (AF) in which the objective lens 23 of the enlarged image capturing unit 20 is focused on the sample SPL is performed.

Based on the signal corresponding to an overhead image formed on the imaging surface of the imaging device 13 of the overhead image capturing unit 10, the overhead image capturing controller 56 generates data corresponding to the overhead image and supplies the data to the integration controller 51. The integration controller 51 performs, according to the program loaded to the main memory of the integration controller 51, processing such as identification of an area in which the sample SPL exists from the overhead image acquired by the overhead image capturing controller 56. Hereinafter, this area is referred to as "small area."

The phase difference image capturing controller 55 generates, based on the signal corresponding to an observation image of each small area that is formed on the imaging surface of the imaging device 24 of the enlarged image capturing unit 20, RAW data corresponding to the observation image of each small area and supplies the RAW data to the integration controller 51. The integration controller 51 supplies the RAW data of each small area, which has been acquired from the phase difference image capturing controller 55, to the development processing unit 59, so that the development processing unit 59 executes development processing. The integration controller 51 connects the data of the enlarged images of respective small areas, which have been developed by the development processing unit 59, to generate a large image for each sample SPL, and performs processing such as dividing the generated large image for each sample SPL into units of a predetermined resolution that is called tile, and other processing. Further, the integration controller 51 supplies each of the generated tiles to the image coding unit 60 and causes the image coding unit 60 to generate image data in a predetermined compression coding format and the storage unit 58 to store the image data.

The storage unit 58 stores various types of setting information or programs for controlling the digital microscope apparatus 100, tile groups in a predetermined compression coding format, and the like.

The development processing unit 59 develops the RAW data of the observation image of each small area that has been captured by the enlarged image capturing unit 20.

The image coding unit 60 codes the image data for each tile in a predetermined image compression format. Here, for example, JPEG (Joint Photographic Experts Group) is adopted as the image compression format. As a matter of course, compression coding formats other than JPEG may be adopted.

The tiles stored in the storage unit 58 are accumulated in an image management server 63 through a network 62 by the communication unit 61. In response to a request from a viewer terminal 64, the image management server 63 sends one or more appropriate tiles to the viewer terminal 64. The viewer terminal 64 generates an observation image for display by using the one or more tiles acquired from the image management server 63 and displays the observation image on a display of the viewer terminal 64.

[Autofocusing of Objective Lens of Enlarged Image Capturing Unit]

In the digital microscope apparatus 100 according to this embodiment, a phase difference autofocusing and a contrast autofocusing are implemented as autofocusing of the objective lens 23 of the enlarged image capturing unit 20.

In the phase difference autofocusing, the integration controller 51 instructs the phase difference image capturing controller 55 to capture a phase difference image. When receiving the instruction, the phase difference image capturing controller 55 takes in signals of a set of phase difference images that are formed side by side on the imaging surface of the imaging device 34, from the phase difference image capturing unit 30, and acquires a phase difference between those phase difference images.

Here, in the enlarged image capturing unit 20, as the focal point of the objective lens 23 is farther than an appropriate surface, identical areas of observed surfaces on the two phase difference images move so as to be separated from each other toward the outward direction of the imaging device 24. Conversely, as the focal point of the objective lens 23 is closer than the appropriate surface, the identical areas of the observed surfaces on the two phase difference images move so as to be close to each other toward the inward direction of the imaging device 24. The integration controller 51 acquires a distance between the identical areas of the observed surfaces on the two phase difference images as a phase difference.

The integration controller 51 acquires, based on the acquired phase difference, the amount of defocus and the orientation of defocus of the focal point of the objective lens 23 with respect to the sample SPL serving as an observation target. The integration controller 51 generates control information for the stage 40 based on the acquired amount and orientation of defocus and supplies the control information to the stage controller 53. The stage controller 53 drives the stage drive mechanism 41 to move the stage 40 in the Z-axis direction based on the control information from the integration controller 51. Thus, the phase difference autofocusing that brings the objective lens 23 of the enlarged image capturing unit 20 into focus on the sample SPL is performed.

In contrast, the contrast autofocusing is a method in which a focal point is searched for in a hill climbing method by use of the enlarged image capturing unit 20. In the contrast autofocusing, the integration controller 51 displaces the focal position of the objective lens 23 by a predetermined distance and causes the enlarged image capturing unit 20 to perform imaging in the imaging range of the sample SPL. The integration controller 51 determines a focal position when an image having a highest contrast in the captured images is captured to be an optimal focal position.

Next, the function of the shading correction implemented in the integration controller 51 of the digital microscope apparatus 100 according to this embodiment will be described.

In the digital microscope apparatus 100 according to this embodiment, it is desirable to satisfactorily perform the shading correction in a state where a preparation is not placed on a stage.

This is because there is a possibility that a foreign material such as dust is held in the preparation, and the state of the dust changes between when a white image is captured and when an enlarged image of the preparation PRT is captured, which adversely affects the shading correction. By performing the shading correction in the state where the preparation is not placed on the stage, it is possible to satisfactorily perform the shading correction without influence due to the foreign material such as dust. In this case, however, a problem of bringing the illumination optical system into focus occurs.

Specifically, because the luminance distribution of a white image depends on the focusing state of the illumination optical system, the shading correction is not appropriately performed due to different focuses of the preparations PRT if a white image is captured in the state where the illumination optical system is not appropriately brought into focus.

(Regarding Integration Controller 51)

Figure 2:
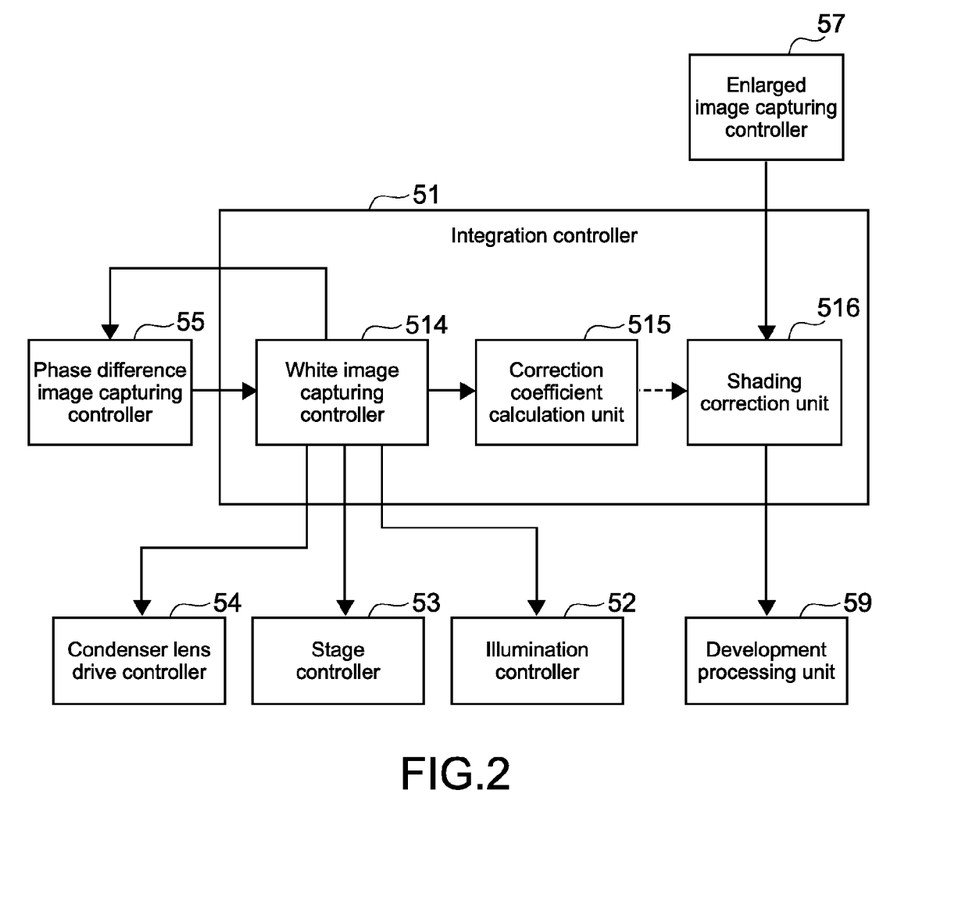
FIG. 2 is a functional block diagram showing functions to perform control in an integration controller 51.

Next, the details of the above-mentioned integration controller 51 will be described. FIG. 2 is a block diagram showing a functional configuration for achieving brining of the illumination optical system into focus in the integration controller 51.

As shown in FIG. 2, the integration controller 51 includes a white image capturing controller (white image acquiring unit) 514, a correction coefficient calculation unit (calculation unit) 515, and a shading correction unit 516. Those functions are achieved when a CPU in the integration controller 51 executes a program loaded to a RAM.

The white image capturing controller 514 performs control to capture a white image necessary for performing shading correction in the state where the preparation PRT is not placed on the stage 40. Here, the capturing of a white image in the state where the preparation PRT is not placed on the stage 40 represents direct capturing of an image of the field stop 22b of the illumination light from the light source 21 through the opening 40a by the imaging device 24 of the enlarged image capturing unit 20, which can be performed because the opening 40a of the preparation PRT is not covered by the preparation PRT. An image captured in this way is the "white image."

More specifically, the white image capturing controller 514 instructs the phase difference image capturing controller 55 to capture a phase difference image in the state where the preparation PRT is not placed on the stage 40. The phase difference image capturing controller 55 causes the phase difference image capturing unit 30 to capture an image. Accordingly, the phase difference image capturing unit 30 acquires a phase difference image with respect to an image of the field stop 22b of the illumination optical system, which is formed by the condenser lens 22a, and the phase difference image is supplied to the white image capturing controller 514. The white image capturing controller 514 calculates phase difference based on the phase difference image, generates defocus information depending on the phase difference, and outputs control information corresponding to the defocus information to the condenser lens drive controller 54. The condenser lens drive controller 54 drives the condenser lens drive mechanism 25 based on the control information. Thus, the objective lens 23 is focused on the image of the field stop 22b of the illumination optical system, which is formed by the condenser lens 22a. After that, the white image capturing controller 514 instructs the illumination controller 52 to turn on the light source 21 and instructs the enlarged image capturing controller 57 to capture an enlarged image. In this way, a white image is captured.

The correction coefficient calculation unit 515 calculates a shading correction coefficient based on the white image captured by the white image capturing controller 514. The method of calculating the shading correction coefficient from the white image is same as the method of the shading correction coefficient from an image captured in the state where the preparation PRT is placed on the stage 40. Because the present disclosure does not have features of the method of calculating the shading correction coefficient, the details of the calculation method is omitted.

The shading correction unit 516 performs shading correction on an enlarged image of the sample SPL captured by the enlarged image capturing controller 57 based on the shading correction coefficient calculated by the correction coefficient calculation unit 515.

It should be noted that the shading correction coefficient calculated by the correction coefficient calculation unit 515 is stored in the storage unit 58 of the controller 50, for example. The shading correction unit 516 reads the shading correction coefficient from the storage unit 58 when an enlarged image of the sample SPL is captured and performs shading correction on the enlarged image of the sample SPL captured by the enlarged image capturing controller 57, actually.

Hereinabove, the details of the integration controller 51 has been described.

(Regarding Overall Flow of Processing)

Figure 3:
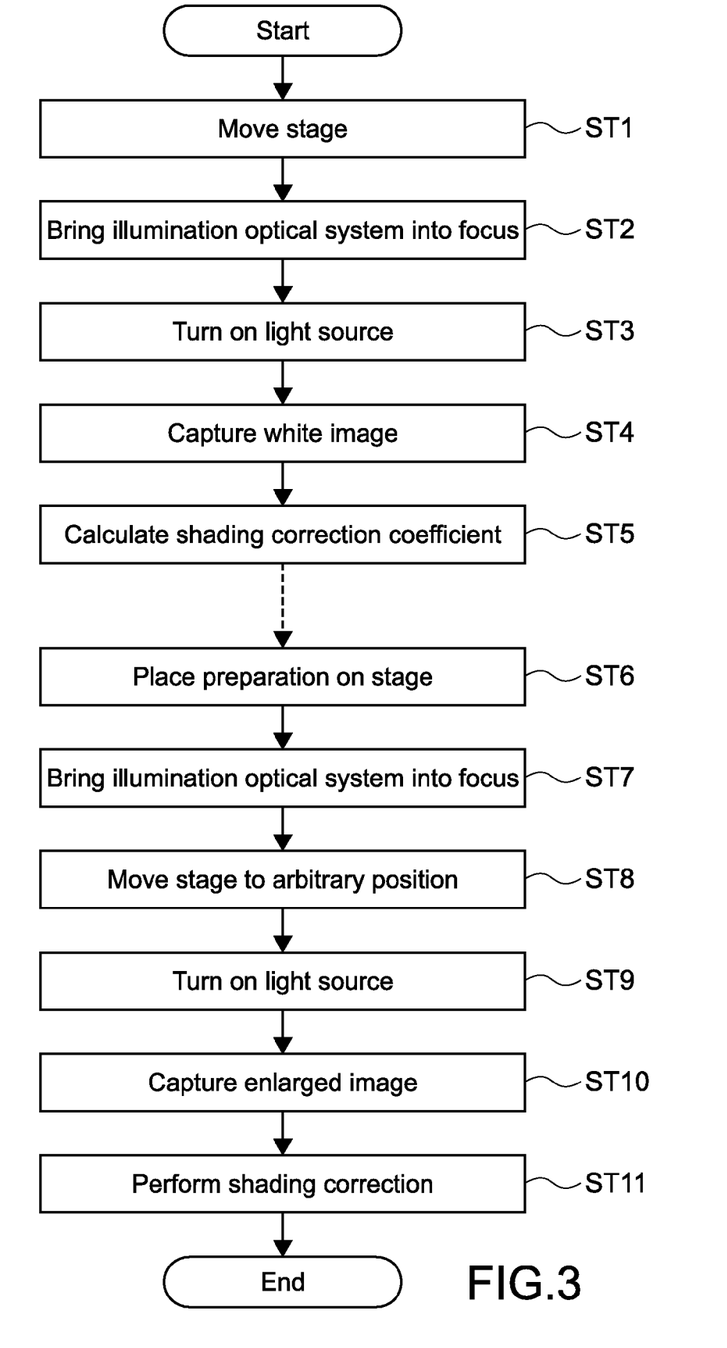
FIG. 3 is a flowchart for explaining a flow of processing up to calculation of a correction coefficient for shading correction and a flow of processing from capturing of individual enlarged images to shading correction, in the digital microscope apparatus 100 according to this embodiment.

Next, a flow of processing up to the calculation of the correction coefficient for shading correction and a flow of processing from the capturing of individual enlarged images to the shading correction in the digital microscope apparatus 100 according to this embodiment will be described. FIG. 3 is a flowchart for explaining the flow of processing up to the calculation of the correction coefficient for shading correction and the flow of processing from the capturing of individual enlarged images to the shading correction in the digital microscope apparatus 100 according to this embodiment.

First, the flow of processing up to acquiring of a white image to calculate a correction coefficient for shading correction will be described. It should be noted that the processing up to acquiring of a white image to calculate a correction coefficient for shading correction described here is favorably performed at a predetermined frequency or more. This is because the luminance distribution acquired from a white image changes due to temperature, influence of stray light, or the like.

If the above-mentioned processing is performed at timing when the preparation stock loader 70 replaces the preparation PRT, there is no need to remove the preparation PRT from the stage 40 for capturing a white image. Therefore, it is effective and it is possible to improve the capturing efficiency.

As a first step, the stage controller 53 moves the stage 40 so that the opening 40a of the stage 40 on which the preparation PRT is not placed is located immediately below the objective lens 23 (step ST1).

The opening described here is not limited to the opening 40a for applying light for imaging to the sample SPL on the preparation PRT when the preparation PRT is imaged as long as the light emitted from the light source 21, transmitted through the condenser lens 22a, and incident on the objective lens 23 is not blocked by the preparation PRT or the glass slide.

As the next step, the white image capturing controller 514 instructs the phase difference image capturing controller 55 to capture a phase difference image. According to the instruction, the phase difference image capturing controller 55 causes the phase difference image capturing unit 30 to capture an image. Accordingly, a phase difference image with respect to an image of the field stop 22b of the illumination optical system, which is formed by the condenser lens 22a, is acquired. The phase difference image capturing controller 55 supplies the phase difference image to the white image capturing controller 514. The white image capturing controller 514 calculates phase difference based on the phase difference image with respect to an image of the field stop 22b of the illumination optical system, generates defocus information depending on the phase difference, and outputs control information corresponding to the defocus information to the condenser lens drive controller 54. The condenser lens drive controller 54 controls the condenser lens drive mechanism 25 so that the condenser lens 22a is moved in the optical axis direction, based on the control information. Thus, the illumination optical system is brought into focus. In other words, the focal point of the objective lens 23 is aligned with the image point of the image of the field stop 22b of the illumination optical system by the condenser lens 22a (step ST2).

Although the phase difference AF is used as a method of bringing the illumination optical system into focus here, the contrast AF may be used to bring the illumination optical system into focus.

It should be noted that because the preparation PRT or glass slide formed of glass having a higher refractive index than air does not exist between the condenser lens 22a and the objective lens 23 when a white image is captured as described above, the optical path of the light emitted from the light source 21 and incident on the imaging device 24 is shortened. Therefore, the illumination optical system including the light source 21 needs to be moved to the direction of the objective lens 23 by a predetermined distance ΔZ as compared with when the preparation PRT is imaged. The predetermined distance ΔZ will be described later.

Next, the white image capturing controller 514 controls the illumination controller 52 to turn on the light source 21 (step ST3).

As the next step, the white image capturing controller 514 instructs the enlarged image capturing controller 57 to capture a white image (step ST4).

As the last step, the correction coefficient calculation unit 515 calculates the correction coefficient for shading correction based on the white image acquired in the step ST4 (step ST5).

Figure 4:
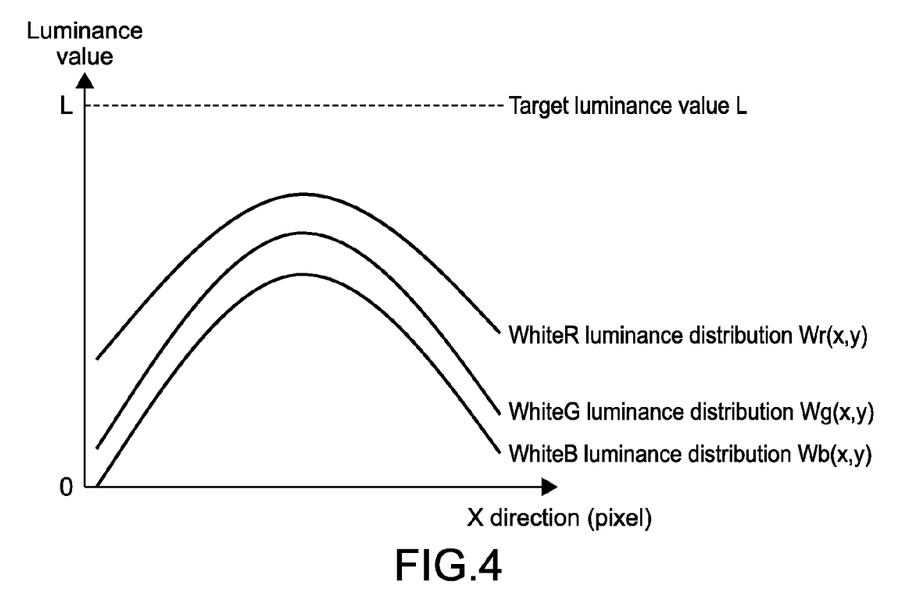
FIG. 4 is a graph showing distribution of information on luminance of a white image in an X direction.

In general, the luminance value of the white image is distributed as shown in FIG. 4. FIG. 4 shows the luminance distribution of information of the white image in the X direction. The luminance distributions of colors of Red, Green, and Blue are separated from each other. The luminance values of the colors of Red, Green, and Blue at each pixel coordinate (x,y) is represented by Wr(x,y), Wg(x,y), and Wb(x,y), respectively.

Here, when a target luminance value after shading correction is assumed to be L, shading correction coefficients LR, LG, and LB for the colors of Red, Green, and Blue, are calculated by the following calculation expressions.

$$LR(x,y)=L/Wr(x,y)$$

$$LG(x,y)=L/Wg(x,y)$$

$$LB(x,y)=L/Wb(x,y)$$

Figure 5:
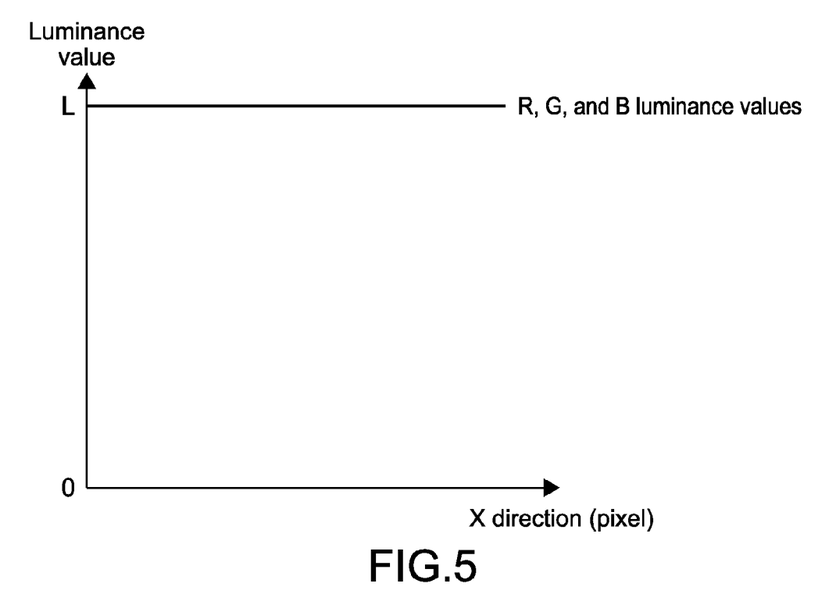
FIG. 5 is a graph showing a state where an RGB luminance value of each pixel of the white image is multiplied by shading correction coefficients LR, LG, and LB, so that the luminance value of each pixel is equal to a target luminance value L.

As shown in FIG. 5, the target luminance value L is obtained by multiplying the luminance values of Red, Green, and Blue of each pixel of a white image by the shading correction coefficients LR, LG, LB, respectively, and thus it is possible to perform shading correction. It should be noted that the method of calculating the correction coefficient is not limited to the above-mentioned method, and any method may be used.

Hereinabove, the flow of processing up to calculating of the correction coefficient for shading correction has been described.

Next, the flow of processing from the capturing of individual enlarged images to the shading correction will be described. In the following processing, the shading correction coefficients LR, LG, and LB calculated in the step ST5 are used.

As a first step, the preparation stock loader 70 places the preparation PRT on the stage 40 (step ST6).

The stage controller 53 moves the stage 40 so that the placed preparation PRT is located directly below the objective lens 23.

As the next step, the integration controller 51 instructs the condenser lens drive controller 54 to bring the condenser lens 22a into focus based on the output from the phase difference image capturing controller 55 (step ST7).

By bringing the condenser lens 22a into focus here, it is possible to prevent the fluctuation of the unevenness of brightness due to defocusing of the condenser lens 22a.

As the next step, the stage controller 53 moves the stage 40 to capture an enlarged image of an arbitrary position of the biological sample SPL (step ST8).

As the next step, the illumination controller 52 turns on the light source 21 (step ST9).

As the next step, the enlarged image capturing controller 57 captures an enlarged image of the biological sample SPL on the preparation PRT (step ST10).

Figure 6:
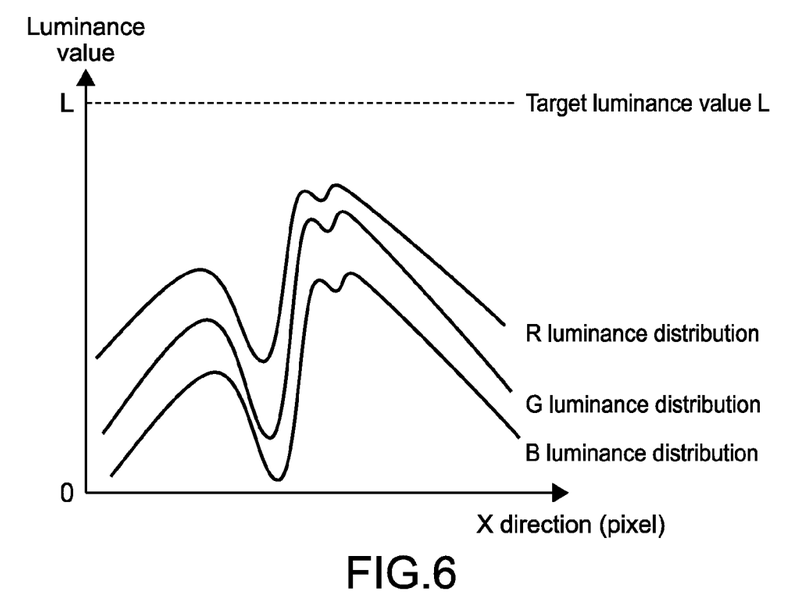
FIG. 6 is a graph showing an example of luminance distribution of a captured enlarged image in the X direction.

An example of the luminance distribution of the captured enlarged image in the X direction is shown in FIG. 6. When an image of the biological sample SPL is photographed on the imaging surface of the imaging device 24, the amount of received light at the pixel position corresponding to the image is decreased. Therefore, the luminance distribution shown in FIG. 6 is obtained.

It should be noted that in the luminance distribution shown in FIG. 6, the luminance value at the central part of the luminance distribution curve in the X direction decreases due to influence of the photographed image of the biological sample SPL and also the luminance value at the peripheral portion of the image decreases. This is due to the decrease in the luminance value at the peripheral portion of the image in the luminance distribution of the white image shown in FIG. 4.

As the last step, the shading correction unit 516 performs shading correction on the enlarged image acquired in the step ST10 (step ST11).

Figure 7:
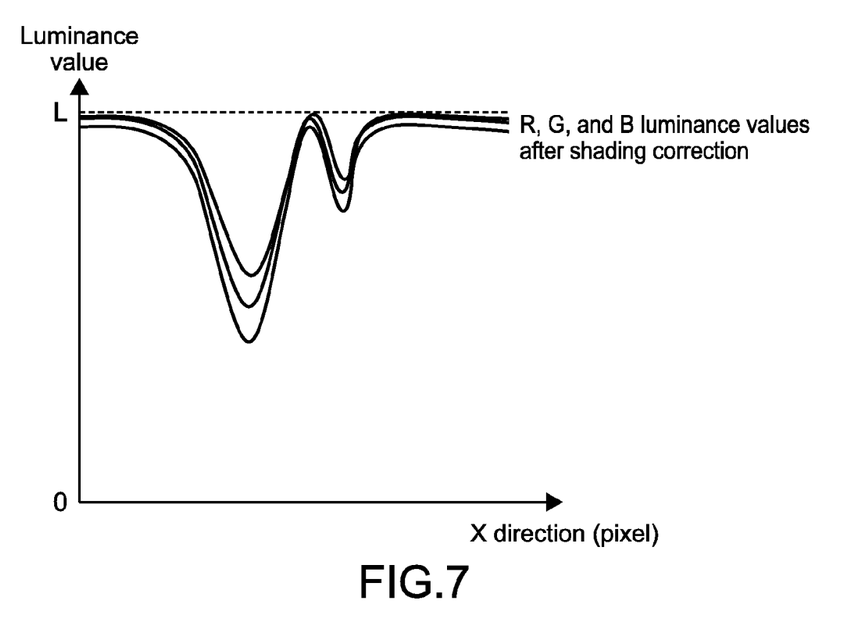
FIG. 7 is a graph showing results acquired by performing shading correction on the luminance distribution shown in FIG. 6.

Shading correction is performed by multiplying the luminance values of Red, Green, and Blue of each pixel in an enlarged image by the shading correction coefficients LR, LG, and LB, respectively. FIG. 7 shows the results obtained by performing shading correction on the luminance distribution shown in FIG. 6. As shown in FIG. 7, the luminance value at the peripheral portion of the image in which the biological sample SPL is not photographed is corrected, and thus the target luminance value L is obtained. The enlarged image in which shading correction has been performed is output to the development processing unit 59.

Hereinabove, the flow of processing from the capturing of individual enlarged images to the shading correction has been described.

(Regarding Adjustment of Light Amount of Light Source 21)

Next, the adjustment of the light amount of the light source 21 when a white image is captured without placing the preparation PRT on the stage 40 will be described.

In the case where light is applied to a common glass slide constituting the preparation PRT from the light source 21, about 4% of light is reflected on the front and rear surfaces of the glass slide. Therefore, in the case where the adjustment of the light amount of the light source 21 is not performed, when a white image is captured without placing the preparation PRT on the stage 40, strong light is incident on the imaging device 24 as compared with the case where the preparation PRT is placed on the stage 40.

As a countermeasure, in the present disclosure, the light amount of the light source 21 is reduced to be about 92% when a white image is captured without placing the preparation PRT on the stage 40. It should be noted that the light reduction may be performed by reducing the light amount of the light source 21 or the opening (not shown).

Owing to the light reduction, it is possible to acquire a white image and an enlarged image, which have almost the same signal intensity, regardless of existence or non-existence of the preparation PRT on the stage 40.

Hereinabove, the adjustment of the light amount of the light source 21 when a white image is captured without placing the preparation PRT on the stage 40 has been described.

(Regarding Adjustment of Positions of Condenser Lens 22a and Stage 40 when White Image is Captured)

Figure 8:
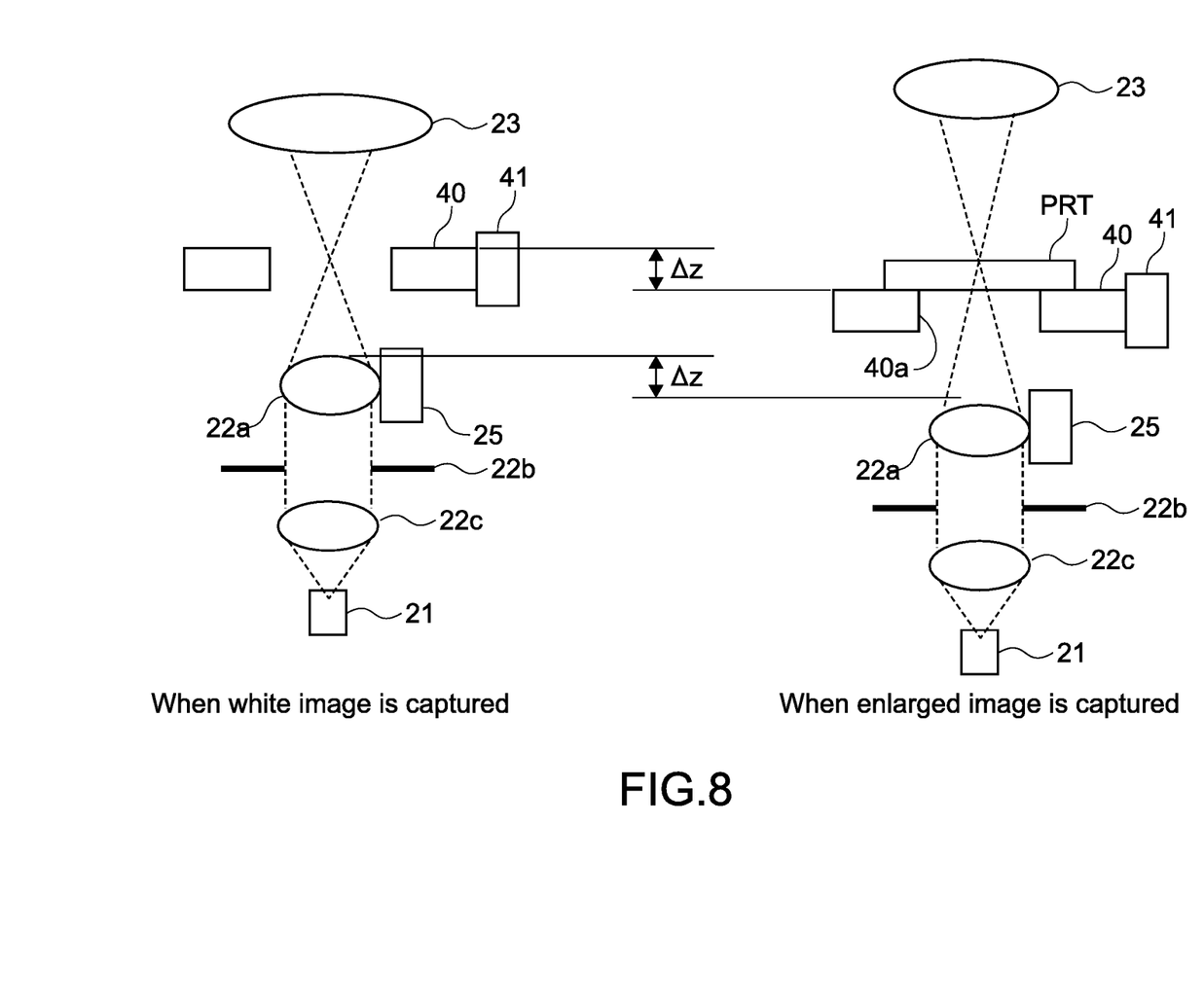
FIG. 8 is a diagram showing a state where positions of a condenser lens 22a, a light source 21, and a stage 40 in a Z-axis direction are moved to the side of an objective lens 23 by ΔZ when a white image is captured (without preparation PRT, left side of FIG. 8), as compared with when an enlarged image is captured (with a preparation, right side of FIG. 8).

The movement of the illumination optical system and the light source 21 to the direction of the objective lens 23 by the distance ΔZ when a white image is captured in the state where the preparation PRT is not placed on the stage 40, which is described above, will be described.

In the case where a transmitting illumination optical system including the condenser lens 22a is telecentric on the side of the objective lens 23, for example, the condenser lens 22a and the light source 21 have to be moved to the objective lens 23 by d(n−1)/n being the specific value of the distance ΔZ when the condenser lens 22a is brought into focus without the preparation PRT, as compared with the case where the preparation PRT having a refractive index n and a thickness d is placed. The reason for the formula is based on Japanese Patent Application Laid-open No. 2012-008450.

In general, it is difficult to ensure sufficient distances between the objective lens 23 and the stage 40 and between the stage 40 and the condenser lens 22a in a microscope.

Therefore, when the illumination optical system and the light source 21 are moved to the side of the objective lens 23 by the distance ΔZ, it is desirable to move also the stage 40 to the side of the objective lens 23 by the distance ΔZ to ensure a predetermined distance or more so that the condenser lens 22a does not collide with the stage 40.

FIG. 8 is a diagram showing a state where positions of the condenser lens 22a, the light collection optical system 22c, the field stop 22b, the light source 21, and the stage 40 in the Z-direction are moved to the side of the objective lens 23 by the distance ΔZ when a white image is captured (without the preparation PRT, left side of FIG. 8) as compared with when an enlarged image is captured (with the preparation PRT, right side of FIG. 8).

As described above, it is possible to ensure a distance between the condenser lens 22a and the stage 40 regardless of the existence or non-existence of the preparation PRT by moving the stage 40 to the side of the objective lens 23 by the distance ΔZ when a white image is captured.

It should be noted that although the stage 40 closes in on the objective lens 23 by the distance ΔZ when a white image is captured, it is easy to ensure a distance between the stage 40 and the objective lens 23 because space is generated by the absence of the preparation PRT.

Hereinabove, the movement of the illumination optical system and the light source 21 to the direction of the objective lens 23 by the distance ΔZ when a white image is captured in the state where the preparation PRT is not placed on the stage 40 has been described.

(Regarding Effects Acquired by Present Disclosure)

The present disclosure can provide not only the above-mentioned effects but also the following effects. (1) In the present disclosure, a white image for shading correction is captured in the state where the preparation PRT is not placed on the stage 40. Therefore, in the case where the digital microscope apparatus 100 includes the preparation stock loader 70 that stores the plurality of preparations PRT as in this embodiment, it is possible to generate the correction coefficient for shading correction at arbitrary timing during the replacement of the preparation PRT. By concurrently performing the replacement of the preparation PRT and calculation of the correction coefficient, it is possible to improve the throughput of acquiring an image of a pathological slide. (2) In the present disclosure, the condenser lens 22a is brought into focus at timing when a white image for shading correction is captured and timing when an enlarged image of the biological sample SPL on the preparation PRT is captured. Therefore, it is possible to generate a correction coefficient for shading correction from which influence of the displacement of the luminance distribution due to the defocus of the condenser lens 22a is removed.

(Supplementary Note)

As a matter of course, the present disclosure is not limited to the above-mentioned embodiments and various modifications can be made without departing from the gist of the present disclosure.

(Another Configuration of Present Disclosure)

It should be noted that the present disclosure may also take the following configurations.

(1) A digital microscope apparatus, including:

an illumination optical system configured to emit illumination light;

a stage having an opening capable of transmitting the illumination light therethrough, on which a preparation is allowed to be placed in accordance with a position of the opening;

an enlarging imaging unit including an objective lens that is configured to enlarge an image and is disposed so as to face the illumination optical system with the stage disposed therebetween and an imaging device configured to capture an image enlarged by the objective lens;

a white image acquiring unit configured
to open the opening of the stage,
to cause the illumination optical system to emit the illumination light in a state where an image point of the illumination optical system is aligned with a focal point of the objective lens of the enlarging imaging unit, and
to acquire, as a white image, an image formed on an imaging surface of the imaging device of the enlarging imaging unit; and a calculation unit configured to use the captured white image to calculate a shading correction coefficient.

(2) The digital microscope apparatus according to (1) above, further including:

a defocus detecting unit configured to detect information on defocus of the enlarging imaging unit; and an adjustment unit configured to adjust a position of the illumination optical system in an optical axis direction, in which the white image acquiring unit causes the adjustment unit to operate so that an image of a field stop of the illumination light is formed on the imaging surface of the imaging device of the enlarging imaging unit, based on the defocus information.

(3) The digital microscope apparatus according to (2) above, in which the adjustment unit performs the adjustment by moving the position of the illumination optical system in a state where the preparation is placed on the stage to a side of the stage by a predetermined distance.

(4) The digital microscope apparatus according to (3) above, in which the white image acquiring unit moves, when the illumination optical system is moved, the position of the stage in a state where the preparation is placed on the stage by the predetermined distance in the same direction as the movement direction of the illumination optical system.

(5) The digital microscope apparatus according to (2) or (3) above, in which the predetermined distance satisfies a relationship given by d(n−1)/n (where d represents a thickness of the preparation and n represents a refractive index of the preparation).

(6) The digital microscope apparatus according to any one of (1) to (5) above, in which the white image acquiring unit sets an intensity of the illumination light to a first intensity when the enlarged image is captured in a state where the preparation is placed on the stage, and sets the intensity of the illumination light to a second intensity when the white image is captured, the second intensity being lower than the first intensity.

(7) An information processing method, including:
  causing, by a white image acquiring unit,
    an adjustment unit configured to adjust a focal position of illumination light to operate so that an image of a field stop of the illumination light is formed on an imaging surface of an imaging device of an enlarging imaging unit in a state where a preparation is not placed on a stage having an opening capable of transmitting the illumination light therethrough, and
    the enlarging imaging unit to capture the image of the field stop formed on the imaging surface of the imaging device as a white image; and
  calculating, by a calculation unit, a shading correction coefficient using the captured white image.

(8) An information processing program that causes a computer to function as:
  a white image acquiring unit configured to cause
    an adjustment unit configured to adjust a focal position of illumination light to operate so that an image of a field stop of the illumination light is formed on an imaging surface of an imaging device of an enlarging imaging unit in a state where a preparation is not placed on a stage having an opening capable of transmitting the illumination light therethrough, and
    the enlarging imaging unit to capture the image of the field stop formed on the imaging surface of the imaging device as a white image; and
  a calculation unit configured to calculate a shading correction coefficient using the captured white image.

It should be understood by those skilled in the art that various modifications, combinations, sub-combinations and alterations may occur depending on design requirements and other factors insofar as they are within the scope of the appended claims or the equivalents thereof.

What is claimed is:

1. A digital microscope apparatus, comprising: an illumination optical system configured to emit illumination light;
  a stage having an opening capable of transmitting the illumination light therethrough, on which a preparation is allowed to be placed in accordance with a position of the opening;
  an enlarging imaging unit including an objective lens that is configured to enlarge an image and is disposed so as to face the illumination optical system with the stage disposed therebetween and an imaging device configured to capture an image enlarged by the objective lens;
  a white image acquiring unit configured to: open the opening of the stage, cause the illumination optical system to emit the illumination light in a state where an image point of the illumination optical system is aligned with a focal point of the objective lens of the enlarging imaging unit, and acquire, as a white image, an image formed on an imaging surface of the imaging device of the enlarging imaging unit;
  a calculation unit configured to use the captured white image to calculate a shading correction coefficient;
  and an adjustment unit configured to adjust a position of the illumination optical system in an optical axis direction, wherein the adjustment unit performs the adjustment by moving the position of the illumination optical system in a state where the preparation is placed on the stage to a side of the stage by a predetermined distance.

2. The digital microscope apparatus according to claim 1, further comprising:
  a defocus detecting unit configured to detect information on defocus of the enlarging imaging unit, wherein
  the white image acquiring unit causes the adjustment unit to operate so that an image of a field stop of the illumination light is formed on the imaging surface of the imaging device of the enlarging imaging unit, based on the defocus information.

3. The digital microscope apparatus according to claim 2, wherein
  the white image acquiring unit moves, when the illumination optical system is moved, the position of the stage in a state where the preparation is placed on the stage by the predetermined distance in the same direction as the movement direction of the illumination optical system.

4. The digital microscope apparatus according to claim 3, wherein the predetermined distance satisfies a relationship given by $d(n-1)/n$, wherein d represents a thickness of the preparation and n represents a refractive index of the preparation.

5. The digital microscope apparatus according to claim 1, wherein
  the white image acquiring unit sets an intensity of the illumination light to a first intensity when the enlarged image is captured in a state where the preparation is placed on the stage, and sets the intensity of the illumination light to a second intensity when the white image is captured, the second intensity being lower than the first intensity.

6. An information processing method, comprising: causing, by a white image acquiring unit, an adjustment unit configured to adjust a focal position of illumination light to operate so that an image of a field stop of the illumination light is formed on an imaging surface of an imaging device of an enlarging imaging unit in a state where a preparation is not placed on a stage having an opening capable of transmitting the illumination light therethrough, wherein the adjustment unit is further configured to perform the adjustment by moving a position of an illumination optical system emitting the illumination light in a state where the preparation is placed on the stage to a side of the stage by a predetermined distance, and the enlarging imaging unit to capture the image of the field stop formed on the imaging surface of the imaging device as a white image;
  and calculating, by a calculation unit, a shading correction coefficient using the captured white image.

7. An information processing program that causes a computer to function as: a white image acquiring unit configured to cause: an adjustment unit configured to adjust a focal position of illumination light to operate so that an image of a field stop of the illumination light is formed on an imaging surface of an imaging device of an enlarging imaging unit in a state where a preparation is not placed on a stage having an opening capable of transmitting the illumination light therethrough, wherein the adjustment unit is further configured to perform the adjustment by moving a position of an illumination optical system emitting the illumination light in a state where the preparation is placed on the stage to a side of the stage by a predetermined distance, and the enlarging imaging unit to capture the image of the field stop formed on the imaging surface of the imaging device as a white image stored on a non-transitory computer-readable medium;

and a calculation unit configured to calculate a shading correction coefficient using the captured white image.

8. The digital microscope apparatus according to claim 1, wherein the white image is acquired when the preparation is not in the opening.

9. The digital microscope apparatus according to claim 1, wherein the white image is acquired while the preparation is being replaced.

10. The digital microscope apparatus according to claim 1, wherein the enlarged image capturing unit comprises a condenser lens that is brought into focus when the image enlarged by the objective lens is captured.

\* \* \* \* \*